United States Patent [19]

Vulliez-Sermet et al.

[11] 3,979,287
[45] Sept. 7, 1976

[54] ADSORPTION PROCESS

[75] Inventors: Pierre Roland Edouard Vulliez-Sermet, London; Elio Fiorentino, West Byfleet, both of England

[73] Assignee: Rohm and Haas Company, Philadelphia, Pa.

[22] Filed: July 9, 1975

[21] Appl. No.: 594,258

[30] Foreign Application Priority Data
July 12, 1974  United Kingdom........... 30951/74

[52] U.S. Cl............................. 210/40; 75/101 BE; 208/263
[51] Int. Cl.²......................................... B01D 15/06
[58] Field of Search .................. 210/39, 40, 24, 30; 208/263; 75/101 BE

[56] References Cited
UNITED STATES PATENTS
2,856,444  10/1958  Pollock ............................ 210/30 X
2,861,948  11/1958  McKellar ............................ 210/30
3,145,167  8/1964  Elder et al. ....................... 210/30 X
3,455,819  7/1969  Crits ................................. 210/80 X
3,846,296  11/1974  Hay.................................... 210/30 X

*Primary Examiner*—Charles N. Hart
*Assistant Examiner*—Ethel R. Cross

[57] ABSTRACT

A process for recovering a dissolved component in high concentration from liquid streams containing said component in low concentration comprising adsorbing said component on a bed of adsorbent, passing a solution containing a high concentration of said component through said bed to increase the amount of component absorbed on said bed and passing an eluant through the bed to regenerate the adsorbent and produce an eluate having a high concentration of said component.

8 Claims, 1 Drawing Figure

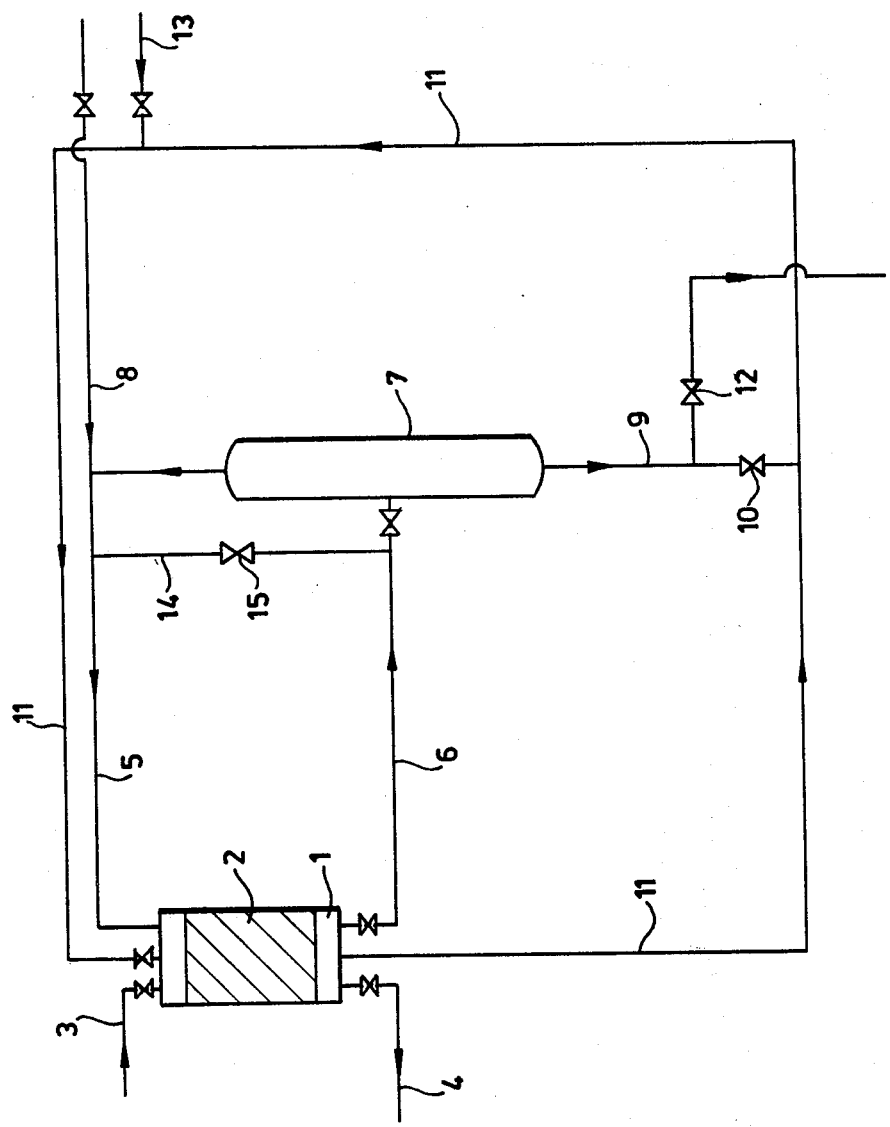

ADSORPTION PROCESS

This invention is concerned with the removal of dissolved components from liquid streams and is particularly useful in the removal of impurities present in small or even trace amounts from industrial effluent or process streams.

For brevity, the component dissolved in the stream to be treated, will be hereinafter called the "adsorbate" and the liquid in which it is dissolved will be called the "liquid medium."

It is known to treat liquid streams with adsorbents, usually in the form of beds of particulate polymers, to remove dissolved components therefrom. In known processes, the streams are passed in contact with the adsorbant generally until the dissolved component (the adsorbate) "leaks" to an unacceptable degree from the bed. Leakage occurs as the adsorbant approaches its capacity loading of the adsorbate and this capacity varies in proportion to the concentration of adsorbate in the stream to be treated, the lower this concentration then the lower the capacity. The adsorbate is then eluted from the adsorbant, together with entrapped liquid medium, often with an organic solvent as eluant, to yield an eluate of solvent plus liquid medium plus adsorbate. The eluant is then removed from the eluate, often by distillation, for recycle leaving the adsorbate in solution in liquid medium. The amount of liquid medium is the amount trapped in the particles in the adsorbant bed and is substantially constant for a given bed volume and adsorbate. The amount of adsorbate is limited by the capacity of the adsorbant and thus in turn by the concentration of adsorbate in the original stream; this is usually very low, thus yielding a rather low concentration of adsorbate in eluted liquid medium. It is clearly advantageous to increase the concentration of adsorbate in eluted liquid medium since, if the adsorbate is an undesirable substance it is thereby concentrated into a lower volume of waste, and if it is a potentially desirable substance, it is thereby provided in a more concentrated form.

We have now found a process by which the adsorbate can be removed from liquid streams and more highly concentrated than hitherto possible without significant extra expenditure on equipment or process operating expenses.

According to the invention there is provided an adsorption process for the removal of dissolved component from a liquid stream in which the dissolved component is present in relatively low concentration, wherein the adsorbant, when loaded with adsorbate from the stream to be treated, is then more highly loaded with adsorbate from a stream, preferably a recirculating stream in which the dissolved component is present in relatively high concentration before being regenerated by contact with eluant.

The process of the invention can be used for any separation or purification which is based upon adsorption. Examples of processes for which it is particularly useful are the removal of phenol from water; of maleic acid or other organic acids, such as adipic, caproic and succinic acids from water; of organic acids, particularly fatty acids, from oils such as edible oils and of high molecular weight acids, e.g., napthenic acid from industrial oils, e.g., lube oil or other crude oil fractions. Other adsorption processes to which the process of the invention can be applied will readily be apparent to the skilled man.

In one embodiment of the invention the recirculating stream is a fraction comprising adsorbate/liquid medium separated from the eluate. Of course in the initial process cycle the more highly concentrated stream has to be made up and injected into the process system but thereafter no make up of adsorbate need be required. Thus, in a preferred embodiment the eluate is treated, for example, by distillation or other separation technique, to separate regenerant from the adsorbate and liquid medium. The regenerant may then be recirculated for use in a subsequent regeneration cycle. The adsorbate/liquid medium is then preferably split into two portions, one containing an amount of adsorbate corresponding to that removed from the treated stream (this is the separated, concentrated adsorbate "product") and the remainder constituting the recirculating stream.

It will be apparent from this description that the adsorbate is thus more concentrated in the liquid medium in the eluate stream because the adsorbate removed from the liquid stream to be treated is concentrated into only a part of the liquid medium entrapped in the adsorbant particles at the end of the loading cycle. The amount of concentration can be varied as required by varying the concentration of the more highly concentrated stream used in the second, or so called superloading, loading cycle. Naturally this concentration must be within the physical, chemical and other performance tolerances of the adsorbant.

The adsorbant can be any material effective to adsorb the dissolved component from the liquid stream. Suitable adsorbants include the macroreticular acrylic and/or styrene and/or divinylbenzene resins currently used or recommended in adsorption precesses. The resins may be ion exchange resins or they may be devoid of ion exchange functionality. However it must be understood that this invention applies only to adsorption processes and therefore to the use of ion exchange resins as adsorbants and not solely as ion exchangers. Furthermore, no restriction is foreseen on the utility in this invention of adsorbants not yet discovered.

Suitable adsorbants include granular cross-linked polymers prepared by suspension polymerization of polymerizable ethylenically unsaturated molecules comprising about 2 to 100 weight percent of at least one poly(vinyl) benzene monomer selected from the group consisting of divinylbenzene, trivinylbenzene, alkyldivinylbenzenes having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus. Besides the homopolymers and copolymers of these poly(vinyl)benzene monomers, one or more of them may be copolymerized with up to 98% (by weight of the total monomer mixture) of (1) monoethylenically unsaturated monomers, or (2) polyethylenically unsaturated monomers other than the poly(vinyl)benzenes just defined, or (3) a mixture of (1) and (2).

Examples of the alkyl-substituted di- and tri-vinylbenzenes are the various vinyltoluenes, the divinylxylenes, divinylethylbenzene, 1,4-divinyl-2,3,5,6-tetramethyl benzene, 1,3,5-trivinyl-2,4,6-trimethylbenzene, 1,4-divinyl 2,3,6-triethylbenzene, 1,2,4-trivinyl-3,5-di-ethylbenzene, 1,3,5-trivinyl-2-methylbenzene.

Examples of other polyethylenically unsaturated compounds include: divinylpyridine, divinylnaphthalenes, diallyl phthalate, ethyleneglycol dicarylate, ethylene glycol dimethacrylate, divinylsulfone, polyvinyl or polyallyl ethers of glycol, or glycerol, of pentaerythritol, of monothio or dithio-derivatives of glycols and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylene diacrylamide, trivinyl naphthalenes and polyvinylanthracenes.

Examples of suitable monoethylenically unsaturated monomers that they may be used in making the granular macroreticular resin of the latter type include: methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate and the corresponding esters of methacrylic acid, ethylene, propylene, isobutylene, diisobutylene, styrene, vinyltoluene, vinyl chloride, vinyl acetate, vinylidene chloride, acrylonitrile. Polyethylenically unsaturated monomers which ordinarily act as though they have only one such unsaturated group, such as isoprene, butadiene and chloroprene, may be used as part of the monoethylenically unsaturated category.

A preferred proportion of the polyethylenically unsaturated compound of the cross-linking type is in the range of about 8 to 25% weight of the total monomer mixture from which the resin is prepared. The suspension polymerization produces the resin in the form of granules or beads having an overall bead size in the range of about 0.1 to about 3 millimeters average diameter.

As has been stated above, the process of the invention need not involve significant extra processing equipment or operating costs over the conventional processes. We have found, surprisingly, that the volume of regenerant required to regenerate an adsorbant bed loaded by the relatively low concentration liquid stream is not significantly less than that required to regenerate the so-called super-loaded bed. In any case, and this is a preferred process according to the invention, the bed can be regenerated with an amount of eluant previously determined to be substantially that required to regenerate the lowly loaded bed, this being passed to the separation process above described, and then flushed with a further amount of regenerant which is simply used first in the next regeneration cycle. In this way the separation operating and equipment costs can be minimized.

Suitable eluants will, as in the case of suitable adsorbants, be chosen according to the individual circumstances. The most commonly used eluants are organic solvents such as methanol and acetone but the choice of eluant is a function of the adsorbant, adsorbate and liquid medium and is not an essential feature of the process of the invention.

There are no theoretical limits to the concentrations of adsorbate in stream that are treatable by the process of this invention. When the stream contains more than 5% of adsorbate it becomes so difficult to superload to a loading significantly higher than the initial loading that commercial viability is prejudiced. The most commercially useful processes will be those in which streams containing 50 ppm, more usually 100 ppm, to 5% by weight adsorbate are treated and most really interesting processes will treat streams containing 500 ppm to 5% of adsorbate. The most advantageous performance can be obtained when treating streams containing 1 to 5% by weight of adsorbate.

As to the stream used for superloading, i.e., the recirculating stream, this can be at any concentration which will significantly increase the capacity of the adsorbant over its capacity when treating the raw liquid stream. Thus a recirculating stream containing less than 5% by weight of adsorbate will rarely be used and most usually the stream will contain more than 5% and usually at most 50% by weight adsorbate. As already stated this stream will usually conveniently be a portion of the adsorbate/liquid medium recovered from the eluate and its concentration will be determined thereby. However make-up liquid medium or adsorbate may be injected into the recirculating stream to adjust its concentration if desired.

Choice of the appropriate concentration for the superloading stream will be assisted by a study of the capacity of the resin chosen at different adsorbate concentrations. This will, of course, be different for different systems. As an example however, we have found the following capacities for a macroreticular synthetic poly(styrene/divinylbenzene) adsorbant relative to the indicated concentrations of phenol in water:

| Capacity g. phenol/l resin | Concentration ppm phenol in water |
| --- | --- |
| 65 | 4,400 |
| 130 | 15,000 |
| 163 | 25,000 |
| 210 | 40,000 |

Flushing of the bed with eluate of raw liquid to be treated between the loading and regeneration cycles to remove and recycle interstitial raw liquid or eluate respectively can be carried out as in normal adsorption processes.

Other features of normal adsorption processes can also be incorporated, such as the inclusion of an ion exchange process in series with the adsorption process if the affinity of the adsorbant matrix for the adsorbate is so low as to require it. In such a case this invention would be applied to the adsorption step but not the ion exchange step.

One preferred form of apparatus for performing the process of the invention will now be described, with reference to the accompanying schematic drawing and for the purposes of illustration only. This apparatus is particularly useful for the removal and concentration of phenol from a waste water effluent and it is in terms of this process, that for convenience only, the functions of the various items of equipment will be described. The apparatus is however useful in other adsorption processes.

A column 1 is packed with adsorbent beads 2 and is fitted with inlet 3 for raw phenolic effluent and outlet line 4 for treated phenolic effluent. This is conventional adsorption apparatus. Provision is made for regeneration and recovery of regenerant (methanol in this example) by regenerant inlet (to the adsorption column)

line 5 and eluate outlet line 6. Methanol can be separated from the eluate in distillation column 7 and there is provision for methanol make-up through line 8. The distillation column can be by-passed via line 14 fitted with valve 15. Concentrated separated phenol can be withdrawn from the column bottoms through line 9. Bottoms in line 9 can be sent, through valve 10 to the super-loading recirculation line 11 or through valve 12, to collection and storage or disposal as "recovered product."

The recirculating super-loading stream line 11 is provided with a make-up line 13. Numerous holding tanks and similar standard equipment, such as provision for reflux to the distillation column 7, although not shown, may be provided as dictated by standard chemical engineering process design techniques bearing in mind the operating procedures described below.

In operation, using the phenol recovery process example, the raw phenolic effluent is first passed through line 3, to column 1 and treated effluent is passed to waste through line 4, until the leakage of phenol into the treated effluent stream in line 4 is unacceptably high. The passage of raw effluent into column 1 is then stopped and the bed 2 is super-loaded with phenol from a recirculating stream of aqueous phenol of significantly higher concentration than the raw effluent stream. This recirculating stream is artificially made up for the first super-loading cycle and introduced through line 13 but thereafter is retained within the system in a manner which will be explained later. The super-loading cycle completed, regeneration is then effected, passing the methanol into the bed 2 through line 5, and out of the bed through line 6. Recovery of methanol for reuse is effected in distillation column 7. The overheads from this column comprise recovered methanol and the bottoms comprise relatively concentrated aqueous phenol. An amount of this concentrated stream containing the phenol adsorbed from the raw effluent is bled off through valve 12 and is the recovered phenol "product." The remainder contains the phenol adsorbed in the super-loading cycle and is led through valve 10 into the recirculation line 11. Methanol losses can be made up through line 8 and adjustments to the concentration of the recirculating stream can be made using line 13.

As is conventional in adsorption processes interstitial liquid is displaced from the bed between loading and regeneration cycles before the valves on the outlet lines are operated. For example after the super-loading cycle enough regenerant is passed into the bed to displace interstitial effluent water before line 11 is closed and line 6 opened. Similarly residual interstitial methanol is displaced through line 6 by raw phenolic effluent before line 6 is closed and line 4 opened.

As has been stated before, the amount of methanol needed substantially to regenerate the initially loaded bed will also substanatially regenerate the super-loaded bed. The substantially regenerated bed 2 can be washed with any further desired amount of methanol, and this will pass from the bed 2 containing only very small amounts, of phenol, if any. There is thus no need to increase distillation costs by passing this methanol through the distillation process so this fraction of regenerant is allowed to by-pass the distillation column 7 through line 14 by suitable operation of valve 15 and is reused as the first regenerant in the next regeneration cycle.

Preferred embodiments of the invention will now be described in the following Examples which are given for the purposes of illustration only.

EXAMPLE 1

The column 1 of the apparatus described above was charged with 1 liter of synthetic poly(styrene/divinylbenzene) adsorbant. A solution of raw phenolic waste water (500 ppm phenol) was passed through the bed until a leakage of 50 ppm phenol in the treated water from line 4 was obtained. At this time the feed of raw water was stopped and the adsorbant was found, by mass balance, to have been loaded with 25.1 grams of phenol.

This loaded sample was then super-loaded with 2.8 liters of 8% by weight aqueous phenol solution, injected into the system through line 8, the treated super-loading solution passing from the bed through line 4. After this treatment the bed was found to have adsorbed 250 g. of phenol.

Three liters of methanol were then passed through the bed as regenerant. The first liter was sent to distillation in column 7 and the subsequent 2 liters were allowed to by-pass the column using line 11. Distillation for methanol recovery yielded a bottom fraction of 59% by weight phenol in water. This separated into two phases; the light phase of 8% aqueous phenol was recycled to the next super-loading cycle and the heavy phase of 70% aqeuous phenol was a valuable commercial product.

The cycle of loading, super-loading and regeneration was then repeated. During the loading cycle phenol leakage into treated effluent was less than 1 ppm until the capacity of the resin was approached. In the regeneration cycle the undistilled 2 liters of methanol were passed through the column before the distillation overheads. Again only the first liter of regenerant passing from the bed was set to distillation.

COMPARATIVE TEST

Example 1 was re-run except that the super-loading cycle was omitted completely. The product from the bottom of the distillation column was a 1.25% aqueous phenol solution which was commercially valueless. The leakage in the second loading cycle was substantially the same as in Example 1, namely less than 1 ppm, so it was clear that the 3 liters of methanol had regenerated the normally loaded and the super-loaded bed to substantially the same degree.

EXAMPLE 2

Recovery of Maleic Acid from Waste Water

The column 1 was filled with 1 liter of synthetic poly(styrene divinylbenzene)adsorbant. An aqueous solution contaning 5,000 ppm of maleic acid was passed through the bed until a leakage of 500 ppm maleic acid in the treated effluent through line 4 was obtained. At this time, the feed of inlet solution was stopped and the adsorbant was found, by mass balance, to have been loaded with 20 grams of maleic acid.

This loaded sample was then super-loaded with 2.5 liters of 8% by weight aqueous maleic acid solution. After this treatment, the bed was found to have adsorbed 200 grams of maleic acid.

Three liters of acetone were then passed through the bed as regenerant. The first was sent to distillation in column 7 and the subsequent 2 liters were stored for the following regeneration.

Distillation for acetone recovery yielded a bottom fraction of 50% by weight maleic acid in water. Part of it was used for the following super-loading step (after dilution to 8%). The rest was the recovered maleic acid solution (as a 50% aqueous solution).

During the subsequent loading cycle, the maleic acid leakage into treated effluent was less than 1 ppm until the capacity of the resin was approached.

COMPARATIVE TEST

The experiment was repeated without including the super-loading cycle. The product from the bottom of the distillation column was a 7.5% aqueous maleic acid solution. The leakage during the second loading cycle was substantially the same as that obtained when using the super-loading cycle.

EXAMPLE 3

The column 1 was filled with 1 liter of a weak base macroreticular anion exchange resin based on a poly(-styrene/divinylbenzene) matrix. A soyabean oil containing 5,000 ppm of fatty acids was passed through the bed until a leakage of 1,000 ppm fatty acids in the treated oil was obtained. The feed of crude oil was then stopped and the adsorbant was found, by mass balance, to have been loaded with 60 grams of fatty acids.

The loaded sample was then super-loaded with 0.5 liter of an acid oil containing 50% by weight of fatty acids. After this treatment the bed was found to have adsorbed 250 grams of fatty acids.

Three liters of isopropanol were then passed through the bed as regenerant. The effluent was sent to distillation for isopropanol recovery, the bottom fraction of distillation being a 73% by weight solution of fatty acids in oil (sold as acid oil).

COMPARATIVE TEST

The experiment was repeated without including the super-loading cycle. The product from the bottom of the distillation column was a 17% by weight solution of fatty acids in oil.

Using this conventional method, the acid oil produced contains less fatty acids and the oil losses are much higher than in the process of the invention.

EXAMPLE 4

Recovery of Caprolactam from Waste Water

The column 1 was filled with 1 liter of a macroreticular synthetic poly(styrene/divinylbenzene)adsorbant. An aqueous solution containing 1200 ppm of E-Caprolactam was passed through the bed until a leakage of 200 ppm occurred in the effluent line (point 4).

At this point, the feed of the inlet solution was stopped and the adsorbant was found to have been loaded with 22gr. of E-Caprolactam.

This loaded sample was then super-loaded with 1.3 liters of 8% weight solution of E-caprolactam in water.

Three liters of acetone were then passed through the bed as regenerant. The first liter was collected and distilled for acetone recovery in column 7 and the subsequent 2 liters were stored for the following regeneration.

Distillation for acetone recovery yielded a bottom fraction of 24% by weight of E-caprolactam in water. Part of it was used for the following super-loading step (after dilution to 8%). The rest was the recovered E-caprolactam solution (as a 24% aqueous solution).

During the subsequent loading cycle the E-caprolactum leakage in the teated effluent was less than 20 ppm until the capacity of the resin was approached.

COMPARATIVE TEST

The experiment was repeated without including the super-loading cycle. The product from the bottom of the distillation column was a 4% aqueous E-caprolactam solution. The leakage during the second loading cycle was substantially the same as that obtained using the superloading cycle.

We claim:
1. A process for separating in concentrated form a dissolved component from a liquid stream in which the dissolved component is present in low concentration which comprises passing the liquid stream through a bed of adsorbent until the capacity of the bed for adsorption of the dissolved component from the liquid streams is substantially reached, passing a more concentrated solution of the dissolved component through the bed of adsorbent until it is more highly loaded with the dissolved component, and thereafter passing an eluant through the bed to regenerate the adsorbent and yield an eluate containing the dissolved component in high concentration.

2. The process of claim 1 wherein the more highly concentrated solution of the dissolved component used to increase the loading of the adsorbent bed is provided from a recirculating stream.

3. The process of claim 1 wherein the more highly concentrated solution of the dissolved component used to increase the loading of the adsorbent bed is a recirculating stream maintained under steady state conditions with a make up stream consisting of the fraction remaining after separation of eluant from the eluate.

4. The process of claim 3 wherein the recirculating stream contains at least 5% by weight of adsorbate.

5. The process of claim 3 wherein the recirculating stream contains more than 5 up to 50% by weight of adsorbate.

6. The process of claim 3 wherein the stream to be treated contains 50 ppm to 5% by weight of adsorbate.

7. The process of claim 3 wherein the stream to be trated contains 500 ppm to 5% by weight of the adsorbate.

8. The process of claim 1 for the removal of phenol from water.

* * * * *